United States Patent [19]

Niss

[11] 3,724,950
[45] Apr. 3, 1973

[54] OPTICAL INSTRUMENT FOR DETERMINING THE DISTANCE BETWEEN TWO MEASURING POINTS

[75] Inventor: Erik Niss, Lidingo, Sweden
[73] Assignee: Aga Aktiebolag, Lidingo, Sweden
[22] Filed: May 21, 1971
[21] Appl. No.: 145,799

[52] U.S. Cl. ............................356/3, 356/9, 356/15
[51] Int. Cl. ...............................................G01c 3/00
[58] Field of Search................356/3, 9, 15, 17, 19, 32

[56] References Cited

UNITED STATES PATENTS 2,050,186   10/1936   Klemperer...............................356/32
1,147,990   7/1915    Von Hofe................................356/19
1,247,185   11/1917   Von Hofe................................356/19

Primary Examiner—William L. Sikes
Assistant Examiner—F. L. Evans
Attorney—Larson, Taylor & Hinds

[57] ABSTRACT

An improvement in an optical measuring instrument intended for the determination of the distance between two measuring points projected onto a basel plane. The basic device comprises a central optical element with a semi-transparent surface and a totally reflecting surface at a right angle thereto. The device also comprises an outer optical element, such as a mirror or a pentagonal prism, arranged in each beam path between the central optical element and each measuring point, which deflects each respective beam path at a right angle. According to the invention, the central optical element is rotatable about an axis which is parallel to the semi-transparent surface as well as to the totally reflecting surface. By rotating the central optical element one beam will sweep in a plane in space which is defined by the parallel beam paths from the outer optical elements to the measuring points. The device is therefore capable of being employed to determine the location of a random point relative to that plane.

3 Claims, 2 Drawing Figures

PATENTED APR 3 1973  3,724,950

INVENTOR
ERIK NISS

Larson, Taylor and Hinds
ATTORNEYS

OPTICAL INSTRUMENT FOR DETERMINING THE DISTANCE BETWEEN TWO MEASURING POINTS

BACKGROUND OF THE INVENTION

The present invention relates to an improvement in an optical measuring instrument for determining the distance between two measuring points projected onto a basal plane. The measuring instrument is of a type which comprises a central optical element with a semi-transparent surface and a totally reflecting surface at a right angle to it, with an outer optical element, such as a mirror or a prism, being present in each beam path between this central optical element and each of the points, which deflects the respective beam path at a right angle.

An instrument of this type is adjusted through alteration of the distance between the outer optical elements, and possibly also through inclination of a line through these outer optical elements, until the parallel beam paths which emanate from the outer optical elements meet the respective measuring point. In doing so, the beam paths between the central optical element and an optical system coordinated with it are made to coincide. The plane in space which is defined by these parallel beam paths may be horizontal, but it may also deviate from the horizontal plane if the measuring points are on a different level, or if the outer optical elements are on a different level from the respective measuring point, or both. This optical system may be active or passive, which means in this context that it can either be designed so as to send out a beam with parallel rays towards the central element and further to the two measuring points, or it can be arranged for the observation or recording of light sent out from the two measuring points.

For certain applications, it may be desirable to determine whether a random point is situated above or below the previously mentioned plane. It is an object of the present invention to provide an optical measuring device of the type mentioned having the capability of determining the location of a random point relative to said plane.

BRIEF SUMMARY OF THE INVENTION

The foregoing and other objects which will be apparent from the following description are achieved according to the present invention by providing, in a device of the type described, a central optical element which is rotatable about an axis parallel to the semi-transparent and totally reflective surfaces thereof.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
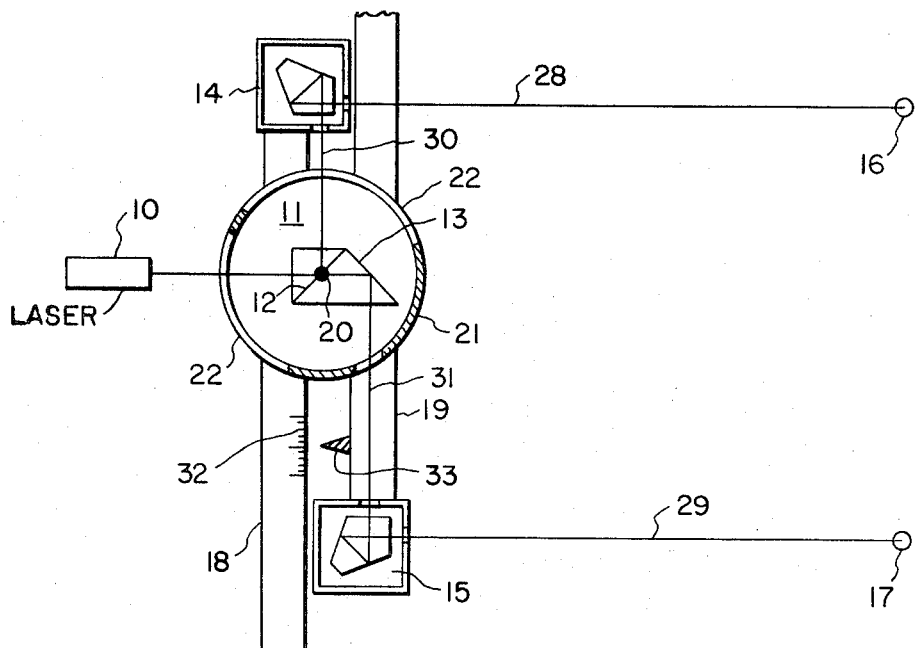
Figure 2:
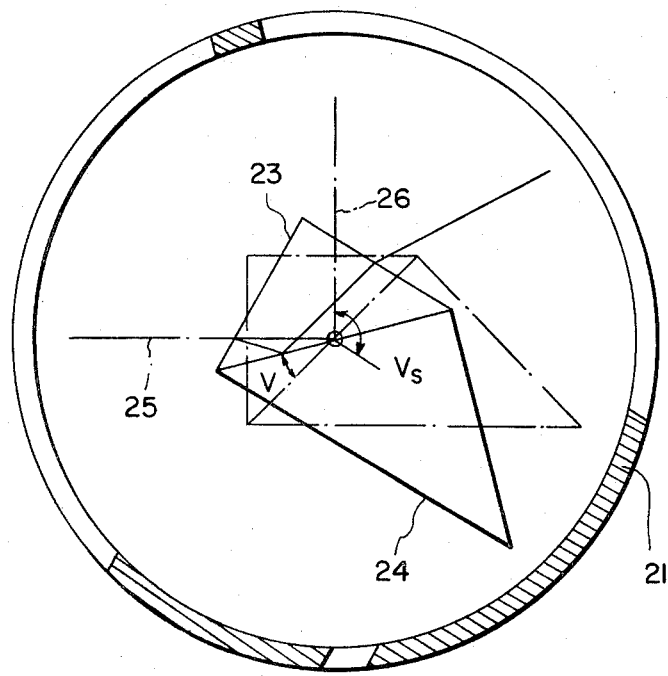

FIG. 1 is a diagrammatic plan view of an improved optical device according to the present invention; and FIG. 2 is an enlarged diagrammatic view of a portion of FIG. 1.

In FIG. 1, the numeral 10 designates the central optical system, which in this case comprises a laser, by means of which a concentrated light beam is emitted towards the central optical element 11. This brings about a division of the beam path from the optical system 10 into two beams 30, 31 which are parallel to one another and oriented in opposite directions to one another. For this purpose the central optical element comprises a semi-transparent surface 12 and a totally reflecting surface 13. These two surfaces are at a right angle to one another. By means of the semi-transparent surface 12 a first beam path 30 is achieved towards one outer optical element 14, while the totally reflecting surface 13 provides a second beam path 31 towards the other outer optical element 15. These two outer optical elements, in the position shown in FIG. 1, cause a right-angle deflection of the respective beam path. This means that in principle they may contain two mirrors placed at an angle of 45°, but it is more advantageous for these outer optical elements to make use of pentagonal prisms, as indicated in the drawings. As a result of this arrangement, the beam paths directed towards the measuring points 16 and 17 are parallel to one another.

The device is constructed so that the distance between the two said beam paths towards the measuring points 16 and 17 can be adjusted from a minimum distance of the order of magnitude of 15 cm to a maximum distance of the order of magnitude of some hundred centimeters. The invention is not limited, however, to such a dimensioning of the apparatus for such distances between the two beam paths to be achieved. In principle, the device may be used for any distances between these beam paths and thus also for the measurement of the distance projected onto a basel plane between the measuring points 16 and 17, this basal plane being at a right angle to the beam paths.

In the present embodiment, the two outer optical elements 14 and 15 are mechanically joined to the central optical element 11 in that each of the outer optical elements is attached to a member 18 and 19, respectively, so that a transport of the outer optical elements 14 and 15 in relation to the central optical element 11 in the direction of beam paths 30 and 31, can be brought about. In this case member 18 is provided with a scale 32, towards which points an index 33 attached to the member 19, this scale having such a gradation that the distance between the beam paths 28 and 29 to the two measuring points 16 and 17 can be read directly. Where points 16 and 17 are located in a line at a right angle to beam paths 28 and 29, the distance measured is the distance between points 16 and 17. Where the line is not at a right angle to the beam paths, the distance measured is the basal plane at a right angle to the beam paths.

According to the present invention, the central optical element 11 is rotatable about an axis 20 which is parallel to the semi-transparent surface 12 as well as to the totally reflecting surface 13. Appropriately, as shown in the drawing, this axis of rotation is situated in the middle of the semi-transparent surface 12. For rotation, central optical element 11 may be rotatably mounted in a conventional manner in a cylindrical housing 21, the cylindrical wall of which presents openings 22.

The effect that is obtained by the revolving of the central optical element 11 is shown by FIG. 2 which, on a larger scale, shows this element together with its cylindrical housing. In this case, the central optical element comprises two rectangular three-sided prisms 23 and 24 which are so joined together that the hypotenuse of the prism 23 rests against one side, other than the hypotenuse, of the prism 24. In FIG. 2 these prisms are shown in broken lines in a position which corresponds to the position shown in FIG. 1, whereas the fully drawn lines show these prisms after a certain rotation about the axis 20.

In the position of the central optical element 11 shown in FIG. 1, the beam path 25 towards the optical system 10 and the beam path 26 towards the outer optical element 14 are at a right angle to one another. A rotation of the central optical element 11 over an angle $V°$ results in a change of angle between the beam paths 25 and 26, which is greater than $2V°$, since the semi-transparent surface 12 is a part of the prism 23 and a diffraction of the beam paths 25 and 26 as indicated in FIG. 2 occurs in the two small sides of prism 23. The angular range $V_s$, which the beam path 26 in this manner can be made to sweep over, becomes consequently approximately 130°, in this embodiment. It will further be appreciated, that if the central optical element 11 is rotated from the position shown in FIG. 1 anti-clockwise about 90°, a beam path directed oppositely to the beam path 26 is obtained, which then, by further rotation of the central optical element 11 in anti-clockwise direction, can be made to sweep over an angular range of equal size to the aforementioned one. In doing so, as mentioned previously, the beam path 26, and the beam path directed oppositely to it respectively, will lie the whole time within the plane in space which is defined by the parallel beam paths 28 and 29, thus making it possible to easily determine if a given random point is located above or below that plane.

What is claimed is:

1. In a device for measuring the distance between two measuring points as projected onto a basal plane comprising a central optical element including a semi-transparent surface and a totally reflecting surface located at a right angle with respect to said semi-transparent surface, a first outer optical element present in the beam path between said semi-transparent surface and a first measuring point and deflecting said beam path at a right angle, a second outer optical element present in the beam path between said totally reflecting surface and a second measuring point and deflecting said beam path at a right angle, the improvement wherein said central optical element is rotatable about an axis parallel to said semi-transparent and totally reflective surfaces whereby said device is provided with the capability of optically determining the location of a given random point relative to a plane common to said first and second outer optical elements and said first and second measuring points, said axis being normal to said plane.

2. A device according to claim 1 wherein said axis is located in said semi-transparent surface.

3. A device according to claim 1 wherein said central optical element comprises two three sided rectangular prisms, the hypotenuse of one prism being adjacent a side other than the hypotenuse of the second prism.

* * * * *